United States Patent
Fu

(10) Patent No.: US 11,106,354 B2
(45) Date of Patent: *Aug. 31, 2021

(54) METHOD AND DEVICE FOR HIDING MESSAGES IN A MESSAGING GROUP

(71) Applicant: Advanced New Technologies Co., Ltd., Grand Cayman (KY)

(72) Inventor: Xiaozhen Fu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/208,811

(22) Filed: Mar. 22, 2021

(65) Prior Publication Data

US 2021/0232284 A1    Jul. 29, 2021

Related U.S. Application Data

(63) Continuation of application No. 16/193,282, filed on Nov. 16, 2018, now Pat. No. 10,956,021, which is a (Continued)

(30) Foreign Application Priority Data

May 19, 2016  (CN) .......................... 201610335250.X

(51) Int. Cl.
*G06F 3/0488* (2013.01)
*H04L 12/58* (2006.01)

(52) U.S. Cl.
CPC ............ *G06F 3/0488* (2013.01); *H04L 51/16* (2013.01)

(58) Field of Classification Search
CPC ............... G06F 3/0488; G06F 3/04842; G06F 3/04817; G06F 3/0482; H04L 51/16; H04L 51/32

See application file for complete search history.

(56) References Cited

U.S. PATENT DOCUMENTS

| 7,506,263 | B1 | 3/2009 | Johnston et al. |
| 7,831,928 | B1 | 11/2010 | Rose et al. |

(Continued)

FOREIGN PATENT DOCUMENTS

| CN | 103544293 | 1/2014 |
| CN | 103684983 | 3/2014 |

(Continued)

OTHER PUBLICATIONS

PCT International Search Report by the International Searching Authority issued in International Application No. PCT/CN2017/080194 dated Jun. 1, 2017; 9 pages.

(Continued)

*Primary Examiner* — Eric J Yoon
(74) *Attorney, Agent, or Firm* — Fish & Richardson P.C.

(57) ABSTRACT

Techniques are provided to reduce the possibility of missing a message when searching for the message in a messaging group. In some implementations, a user input that indicates a selected contact in a messaging group, is received. The messaging group includes a plurality of messages posted by one or more contacts. From among the plurality of messages, a first set of messages that includes messages posted by the selected contact is identified. On a display interface, the messages of the first set is displayed while hiding messages from the plurality of messages that are not included in the first set. Optionally, a second set of messages that includes messages that were not posted by the selected contact, is identified from among the plurality of messages. A hidden message quantity is determined based on a number of messages in the second set of messages and displayed on the display interface.

20 Claims, 15 Drawing Sheets

Related U.S. Application Data continuation of application No. PCT/CN2017/080194, filed on Apr. 12, 2017.

(56) References Cited

U.S. PATENT DOCUMENTS

| | | | |
|---|---|---|---|
| 2009/0013265 | A1 | 1/2009 | Cole et al. |
| 2013/0185363 | A1 | 7/2013 | DeLuca et al. |
| 2014/0047358 | A1 | 2/2014 | Park et al. |
| 2014/0304180 | A1 | 10/2014 | He et al. |
| 2015/0088784 | A1* | 3/2015 | Dhara ............... G06N 5/02 706/11 |
| 2015/0177974 | A1 | 6/2015 | Lu et al. |
| 2016/0004761 | A1 | 1/2016 | Zhang et al. |
| 2016/0057093 | A1 | 2/2016 | Seo et al. |
| 2016/0072755 | A1 | 3/2016 | Su et al. |

FOREIGN PATENT DOCUMENTS

| | | |
|---|---|---|
| CN | 104391625 | 3/2015 |
| CN | 104866174 | 8/2015 |
| CN | 105337847 | 2/2016 |
| CN | 105407033 | 3/2016 |
| CN | 106202095 | 12/2016 |
| JP | 2000115343 | 4/2000 |
| JP | 2001157186 | 6/2001 |
| JP | 2008210259 | 9/2008 |
| JP | 2010263578 | 11/2010 |
| JP | 2011022811 | 2/2011 |
| JP | 2014029665 | 2/2014 |
| JP | 2014056294 | 3/2014 |
| TW | 200630870 | 9/2006 |
| TW | 201519068 | 5/2015 |
| WO | WO 2010035841 | 4/2010 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Preliminary Report on Patentability in International Application No. PCT/CN2017/080194 dated Nov. 20, 2018; 10 pages.

\* cited by examiner

METHOD AND DEVICE FOR HIDING MESSAGES IN A MESSAGING GROUP

CROSS-REFERENCE TO RELATED APPLICATIONS

This application is a continuation of and claims the benefit of priority of U.S. patent application Ser. No. 16/193,282, filed Nov. 16, 2018, which is a continuation of PCT Application No. PCT/CN2017/080194, filed on Apr. 12, 2017, which claims priority to Chinese Patent Application No. 201610335250.X, filed on May 19, 2016, and each application is hereby incorporated by reference in its entirety.

TECHNICAL FIELD

The present application relates to the field of Internet communications technologies, and specifically, to a method and device for processing a group message.

BACKGROUND

With the development of Internet technologies, Internet-based instant messaging (IM) application are widely used. Currently, a chat group can be set up in an IM application. The chat group can include a plurality of members. Each member can start group chat by establishing a chat group. Each member can generate group chat messages during the group chat, and the IM application displays the group chat messages generated during the group chat in a chat window.

Currently, the group chat messages generated by each member are accompanied with posting times. The IM application displays all the group chat messages in a chatting interface based on the posting times of the group chat messages generated during the group chat. It is worthwhile to note that a display window of the chatting interface has a fixed size. When a relatively large quantity of group chat messages are generated during the group chat, the IM application moves group chat messages posted earlier in the display window upwards and moves the group chat messages out of the display window, and sets a scroll bar in the display window. If a user wants to view group chat messages posted earlier, the user can drag the scroll bar to move the group chat messages that the user wants to view to the display window. When all the group members use the chat group to chat, if a member posts a key message while another member paid no attention to the chatting interface, the key message may be moved out of the display window due to newly generated group chat messages. Consequently, the member paid no attention may miss the key message.

SUMMARY

In view of this, the present application provides a method and device for processing a group message, to reduce the probability of missing a key message in group chat messages.

To resolve the previous technical problem, a first aspect of the present application provides a method for processing a group message, including: detecting an operation for a first contact in a group message display interface; displaying all messages of the first contact in the group message display interface according to a time sequence that the messages are posted; and hiding messages of other contacts.

Optionally, the method further includes the following: detecting that a profile picture of the first contact in the group message display interface is dragged by a predetermined distance in a first direction; displaying all the messages of the first contact in the group message display interface according to a time sequence that the messages are posted based on the profile picture of the first contact; and displaying a quantity of messages posted by other contacts at a display location in the group message display interface according to a time sequence that the messages are posted.

Optionally, the method further includes the following: changing a color of the group message display interface, and/or displaying, in the group message display interface, a prompt of selecting the messages of the first contact.

Optionally, the method further includes the following: displaying a first icon and a second icon at a predetermined location in the group message display interface, where the first icon represents an icon indicating all contacts, and the second icon represents a profile picture icon indicating the selected first contact.

Optionally, the method further includes: displaying messages of all the contacts according to a time sequence that the messages are posted when detecting, at the predetermined location in the group message display interface, that the first icon is tapped; and/or displaying all messages corresponding to the message quantity according to a time sequence that the messages are posted when detecting, in the group message display interface, that the message quantity is tapped.

Optionally, after the display of all messages of the first contact in the group message display interface according to a time sequence that the messages are posted based on the profile picture of the first contact, the method further includes: detecting that a profile picture of a second contact in the group message display interface is dragged by a predetermined distance in the first direction; additionally displaying all messages of the second contact in the group message display interface according to a time sequence that the messages are posted based on the profile picture of the second contact, where all the messages of the first contact and all the messages of the second contact are displayed according to a time sequence that the messages are posted; additionally displaying a third icon at a predetermined location in the group message display interface, where the third icon represents a profile picture icon indicating the selected second contact; and subtracting, in the group message display interface, a message quantity of the second contact from the message quantity of the other contacts that is displayed at the corresponding display location according to a time sequence that the messages are posted.

Optionally, the method further includes: detecting that a second icon or the third icon at the predetermined location in the group message display interface is dragged by a predetermined distance in a second direction; skipping displaying, in the group message display interface, messages of a contact corresponding to the second icon or the third icon; and increasing, in the group message display interface by a message quantity of the contact corresponding to the second icon or the third icon, the message quantity of the other contacts that is displayed at the display location according to a time sequence that the messages are posted.

Optionally, the method further includes: when detecting a new message, displaying the new message in the group message display interface if determined that the new message is posted by a selected contact or posted by the user; or if determined that the new message is posted by another contact, skipping displaying the new message in the group message display interface, and displaying the message quantity at the corresponding display location according to a time sequence that the messages are posted.

An implementation of the present application further provides a device for processing a group message, including: a detection module, configured to detect an operation for a first contact in a group message display interface; a first display module, configured to display all messages of the first contact in the group message display interface according to a time sequence that the messages are posted; and a hiding module, configured to hide messages of other contacts.

Optionally, the detection module is configured to detect that a profile picture of the first contact in the group message display interface is dragged by a predetermined distance in a first direction.

The first display module is configured to display all the messages of the first contact in the group message display interface according to a time sequence that the messages are posted based on the profile picture of the first contact.

Optionally, the device further includes: a second display module, configured to display a message quantity of the other contacts at a corresponding display location in the group message display interface according to a time sequence that the messages are posted.

Optionally, the device further includes: a selection notification module, configured to change a color of the group message display interface, and/or display, in the group message display interface, a notification of selecting the messages of the first contact, after the detection module detects that the profile picture of the first contact in the group message display interface is dragged by the predetermined distance in the first direction.

Optionally, the device further includes a third display module, configured to display a first icon and a second icon at a predetermined location in the group message display interface, where the first icon represents an icon indicating all contacts, and the second icon represents a profile picture icon indicating the selected first contact.

Optionally, the detection module is further configured to detect, at the predetermined location in the group message display interface, that the first icon is tapped; and the first display module is further configured to display messages of all the contacts according to a time sequence that the messages are posted; and/or the detection module is further configured to detect, in the group message display interface, that the message quantity is tapped; and the first display module is further configured to display all messages corresponding to the message quantity according to a time sequence that the messages are posted.

Optionally, the detection module is further configured to detect that a profile picture of a second contact in the group message display interface is dragged by a predetermined distance in the first direction, after the first display module displays all the messages of the first contact in the group message display interface according to a time sequence that the messages are posted.

The first display module is further configured to additionally display all messages of the second contact in the group message display interface according to a time sequence that the messages are posted based on the profile picture of the second contact, where all the messages of the first contact and all the messages of the second contact are displayed according to a time sequence that the messages are posted.

A third display module is configured to additionally display a third icon at a predetermined location in the group message display interface, where the third icon represents a profile picture icon indicating the selected second contact.

The second display module is further configured to subtract, in the group message display interface, a message quantity of the second contact from the message quantity of the other contacts that is displayed at the corresponding display location according to a time sequence that the messages are posted.

Optionally, the detection module is further configured to detect that a second icon or the third icon at the predetermined location in the group message display interface is dragged by a predetermined distance in a second direction.

The first display module is further configured to skip displaying, in the group message display interface, messages of a contact corresponding to the second icon or the third icon.

The second display module is further configured to increase, in the group message display interface by a message quantity of the contact corresponding to the second icon or the third icon, the message quantity of the other contacts that is displayed at the corresponding display location according to a time sequence that the messages are posted.

Optionally, the first display module is further configured to display a new message in the group message display interface if the detection module detects the new message and determines that the new message is a new message posted by a selected contact or a new message posted by the user.

The second display module is further configured to skip displaying a new message in the group message display interface, and display the message quantity at the corresponding display location according to a time sequence that the messages are posted, if the detection module detects the new message and determines that the new message is a new message posted by another contact.

In the implementations of the present disclosure, after the selected contact is operated in the group message display interface, message content of the selected contact can be displayed in the group message display interface, and message content of the other contacts' message is hidden or the message quantity is automatically displayed at the corresponding display location according to a time sequence that the messages are posted of the other contacts. As such, a user can quickly and conveniently select, from the group message display interface, messages posted by a contact who the user wants to know, and does not miss the messages posted by the contact who the user wants to know. Therefore, a probability of missing messages is reduced.

A product implementing the present application may achieve some or all the previous (i.e., above) technical effects.

BRIEF DESCRIPTION OF DRAWINGS

The accompanying drawings described here are intended to provide a further understanding of the present application, and constitute a part of the present application. Example implementations of the present application and descriptions of the implementations are intended to describe the present application, and constitute no limitation on the present application. In the accompanying drawings.

DESCRIPTION OF IMPLEMENTATIONS

Figure 1:
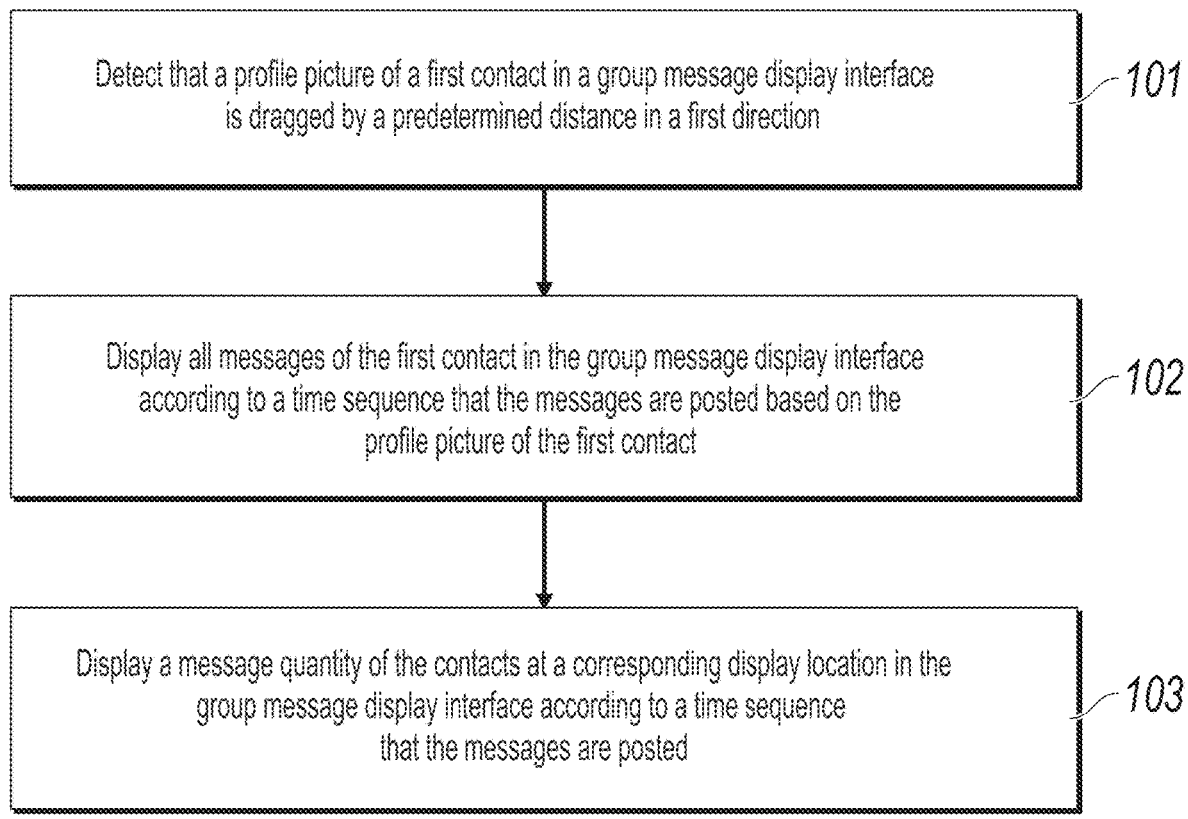
FIG. 1 is a schematic flowchart illustrating a method for processing a group message, according to an implementation of the present application.

The implementations of the present application are described below in detail with reference to accompanying drawings and implementations to provide a full understanding of how to use technical means in the present application to resolve technical problems and achieve technical effects.

In a typical configuration, a computing device includes one or more processors (CPU), an input/output interface, a network interface, and a memory.

The memory can include a non-persistent memory, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase-change random access memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or other optical storages, a cassette magnetic tape, a magnetic tape/magnetic disk storage or other magnetic storage devices or any other non-transmission media. The computer storage medium can be used to store information accessible by the computing device. Based on the definition in the present specification, the computer readable medium does not include transitory computer readable media (transitory media) such as a modulated data signal and carrier.

For example, some words are used in the present specification and claims to represent specific components. A person skilled in the art should understand that a hardware manufacturer can name the same component by using different nouns. In the present specification and claims, components are not distinguished between each other by using different names. Instead, the components are distinguished between each other by using different functions. For example, the word "include" mentioned throughout the present specification and claims is an open term and should be interpreted as "including but not limited to". "Substantially" means that within an acceptable error range, so that a person skilled in the art can resolve the technical problems within a certain error range to achieve the technical effects. In addition, the word "coupling" here includes any direct/indirect electrical coupling means. Therefore, if a first device is described as being coupled to a second device in the present specification, it means that the first device can be directly electrically coupled to the second device, or indirectly electrically coupled to the second device by using another device or in a coupling means. The subsequent descriptions in the present specification are preferred implementations of the present application. However, the descriptions are intended to describe general principles of the present application, and are not intended to limit the scope of the present application. The protection scope of the present application is subject to the appended claims.

It is worthwhile to further note that, the terms "include", "comprise", or their any other variants are intended to cover a non-exclusive inclusion, so a product or a system that includes a list of elements not only includes those elements but also includes other elements which are not expressly listed, or further includes elements inherent to such product or system. Without more constraints, an element preceded by "includes a . . . " does not preclude the existence of additional identical elements in the product or system that includes the element.

To reduce an existing probability of missing a key message in group chat messages, an inventive idea of the present disclosure is as follows: When an operation for a first contact is detected in a group message display interface, all messages of the first contact are displayed in the group message display interface according to a time sequence that the messages are posted, and messages of other contacts are hid. As such, a user can quickly and conveniently select, from the group message display interface, messages posted by a contact who the user wants to know, and does not miss the messages posted by the contact who the user wants to know. Therefore, the probability of missing messages is reduced. The present disclosure is described below in detail with reference to specific implementations.

FIG. 1 is a schematic flowchart illustrating a method for processing a group message, according to an implementation of the present application. As shown in FIG. 1, the method includes the steps below.

101. Detect that a profile picture of a first contact in a group message display interface is dragged by a predetermined distance in a first direction.

Figure 2:
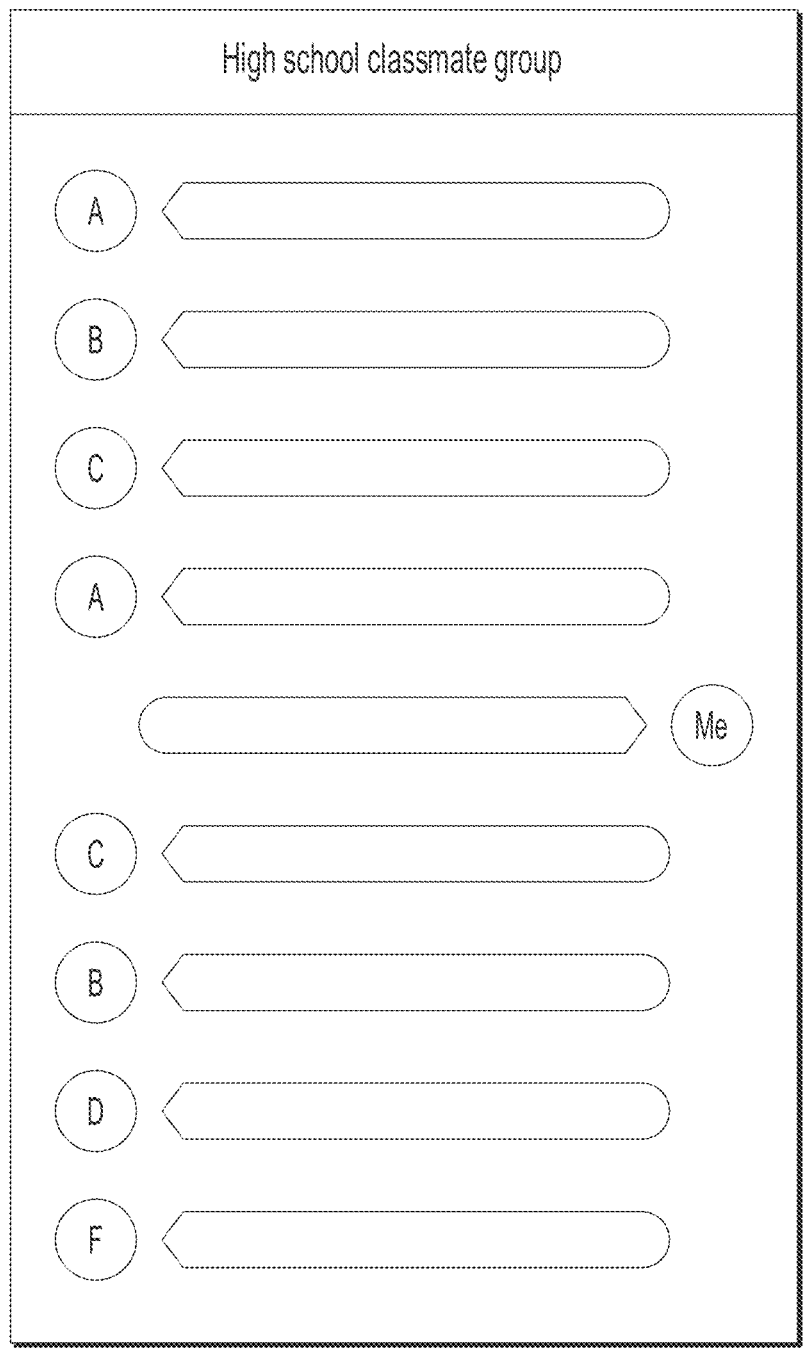
FIG. 2 is a schematic diagram illustrating an example group message display interface.

FIG. 2 is a schematic diagram illustrating an example group message display interface. FIG. 2 shows a high school classmate group. When contacts in the group post messages, the messages are displayed in the group message display interface according to a time sequence that the messages are posted.

Figure 3:
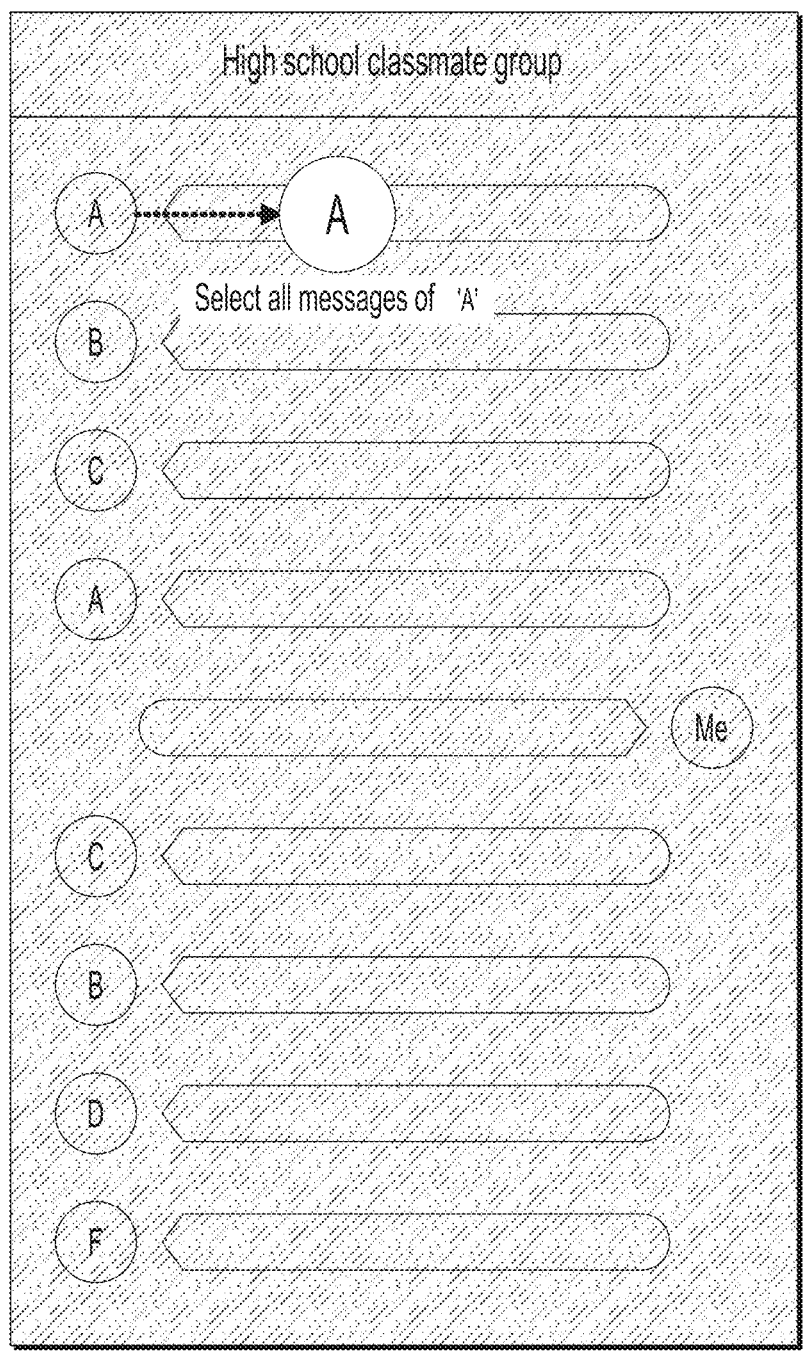
FIG. 3 is a schematic diagram illustrating a profile picture dragging direction, according to an implementation of the present disclosure.

The first direction in this implementation of the present disclosure can be a horizontal rightward direction along a touchscreen. The first direction can be a vertical direction or another direction along the touchscreen. The first direction is not limited in the present disclosure. FIG. 3 is a schematic diagram illustrating a profile picture dragging direction, according to an implementation of the present disclosure. As shown in FIG. 3, when a user wants to select a message of contact A (the first contact) in the group, the user can tap (lock or select) the profile picture of contact A (referred to as the profile picture of A for short) in the group message display interface by using a finger or another touch tool, and drag the profile picture of A by a certain distance (the predetermined distance) in the horizontal rightward direction along the touchscreen. Optionally, the color of the group message display interface in this implementation of the present disclosure can be changed. As shown in FIG. 3, the group message display interface turns gray after the profile picture of A is dragged by a certain distance (the predetermined distance) in the horizontal rightward direction along the touchscreen. Optionally, a prompt of selecting a message of a selected contact is displayed in the group message display interface. As shown in FIG. 3, a prompt of "selecting all messages of contact A" is displayed.

102. Display all messages of the first contact in the group message display interface according to a time sequence that the messages are posted based on the profile picture of the first contact.

Figure 4:
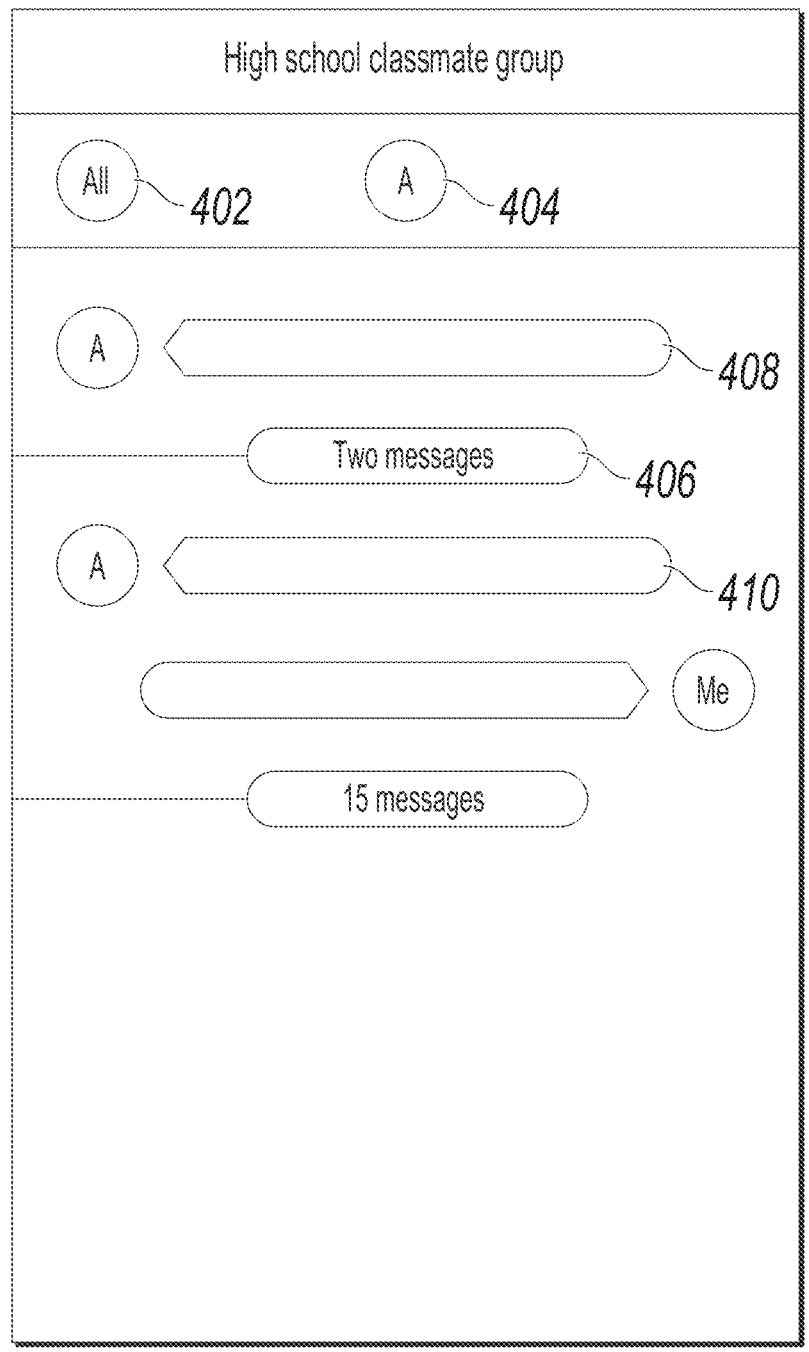
FIG. 4 is a schematic diagram illustrating a display interface of a selected message of a contact, according to an implementation of the present disclosure.

FIG. 4 is a schematic diagram illustrating a display interface of a selected message of a contact according to an implementation of the present disclosure. As shown in FIG. 4, when the user releases the finger (that is, the user releases the profile picture of contact A), all the messages posted by contact A are displayed in the group message display interface, and are specifically displayed according to a time sequence that the messages of contact A are posted.

Optionally, as shown in FIG. 4, a first icon 402 and a second icon 404 are displayed at a predetermined location in the group message display interface (such as a top location in the group message display interface shown in FIG. 4). The first icon 402 represents an icon indicating all contacts, such as the icon "All" shown in FIG. 4. The second icon 404 represents a profile picture icon indicating the selected first contact, such as the icon that depicts the profile picture of contact A shown in FIG. 4. In the present disclosure, to represent the selected contact, the second icon can be highlighted or displayed in another color.

The predetermined location is not limited to the top location in the group message display interface.

103. Display a message quantity of other contacts at a corresponding display location in the group message display interface according to a time sequence that the messages are posted.

After the messages of contact A are selected and are displayed in the group message display interface, the quantity of messages posted by the other contacts is displayed at the corresponding display location according to a time sequence that the messages are posted. As shown in FIG. 4, after contact A posts the first message, other contacts may also post one or more messages. In this case, message content of the other contacts is not displayed under a location where the first message posted by contact A is displayed. Instead, only the quantity of messages posted by the other contacts is displayed.

In this implementation of the present disclosure, content of a message posted by the user is displayed at a corresponding display location according to a time sequence that the messages are posted.

In this implementation of the present disclosure, after the profile picture of the selected contact is dragged by a predetermined distance in a predetermined direction in the group message display interface, message content of the selected contact can be displayed in the group message display interface, and the message content of the other contacts are not displayed. Instead, the message quantity is automatically displayed at the corresponding display location according to a time sequence that the messages are posted. As such, the user can quickly and conveniently select, from the group message display interface, messages posted by a contact who the user needs to know, and does not miss the messages posted by the contact who the user needs to know. Therefore, a probability of missing messages is reduced.

Figure 5:
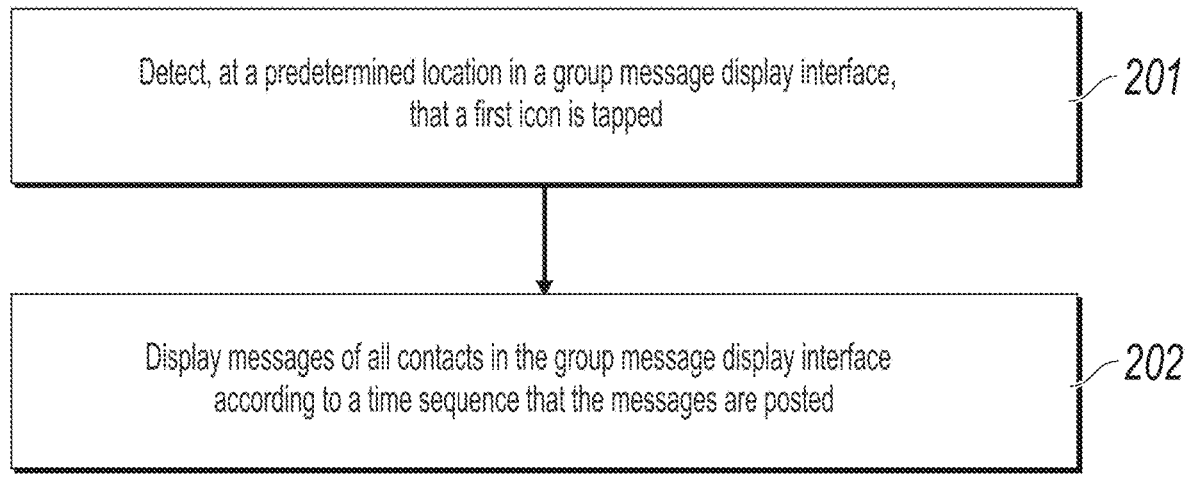
FIG. 5 is a schematic flowchart illustrating a method for processing a group message, according to an implementation of the present application.

FIG. 5 is a schematic flowchart illustrating a method for processing a group message, according to an implementation of the present application. As shown in FIG. 5, the method includes the steps below.

201. Detect, at a predetermined location in the group message display interface, that a first icon is tapped.

Figure 6:
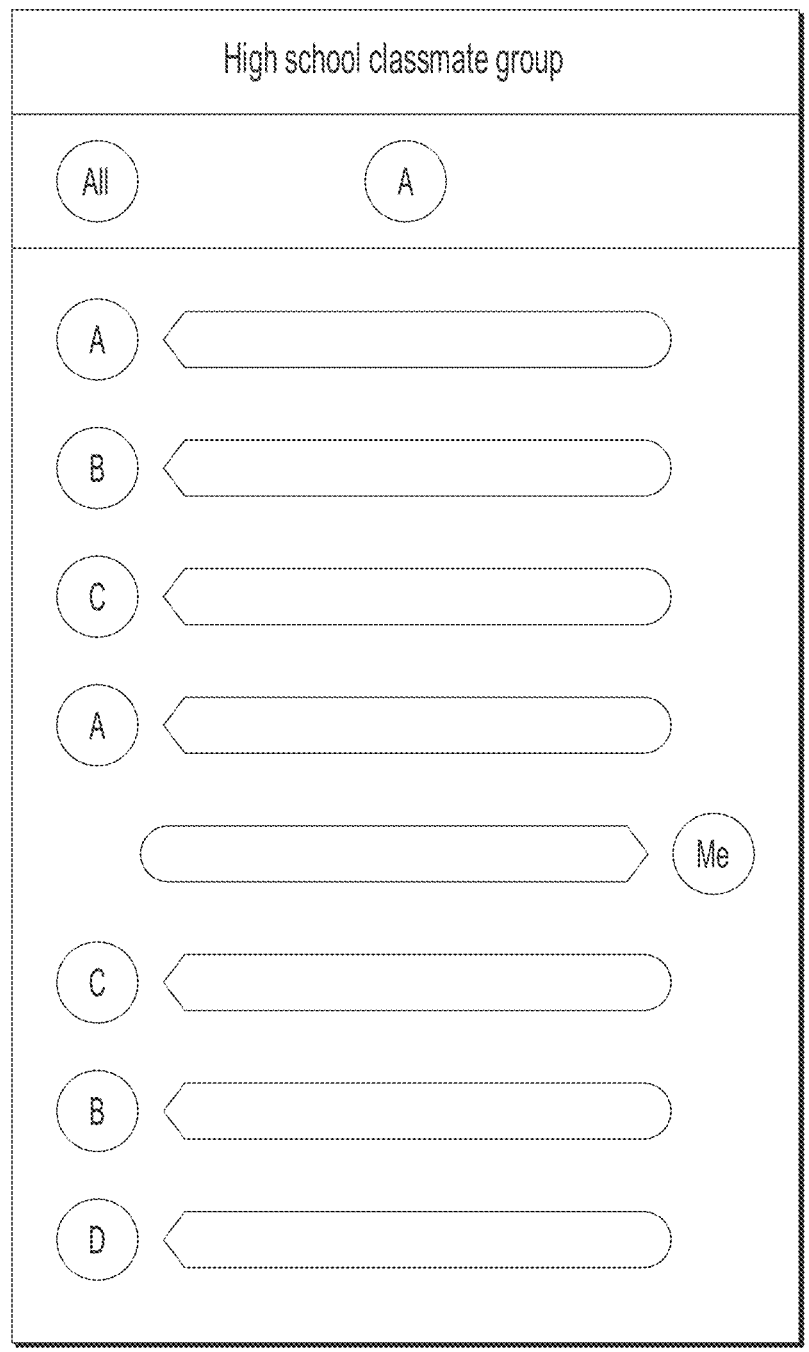
FIG. 6 is a schematic diagram illustrating a message restoration method, according to an implementation of the present disclosure.

Optionally, when the first icon is tapped, the first icon can be highlighted or changed in color. FIG. 6 is a schematic diagram illustrating a message restoration method, according to an implementation of the present disclosure. As shown in FIG. 6, when the user taps the icon "All" (the first icon) in the group message display interface, the icon "All" turns, for example, from gray to green.

202. Display messages of all contacts in the group message display interface according to a time sequence that the messages are posted.

As shown in FIG. 6, when the user taps the icon "All" (the first icon) in the group message display interface, the messages of all the contacts are displayed in the group message display interface according to a time sequence that the messages are posted. In this case, the profile picture of the selected contact A (the second icon) turns, for example, from highlighted blue to gray.

Figure 7:
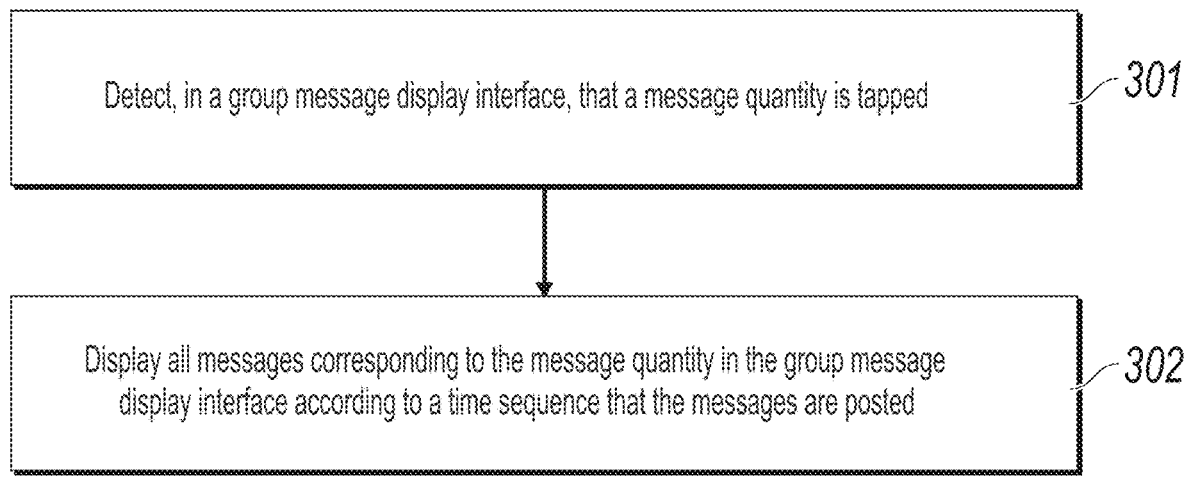
FIG. 7 is a schematic flowchart illustrating a method for processing a group message, according to an implementation of the present application.

FIG. 7 is a schematic flowchart illustrating a method for processing a group message, according to an implementation of the present application. As shown in FIG. 7, the method includes the steps below.

301. Detect, in the group message display interface, that the message quantity is tapped.

302. Display all messages corresponding to the message quantity in the group message display interface according to a time sequence that the messages are posted.

When the user taps "two messages" and "15 messages" shown in FIG. 4, message content of the "two messages" and the "15 messages" can be shown in the display interface of FIG. 6, and is displayed in the group message display interface according to a time sequence that the messages are posted.

In this implementation of the present disclosure, after the first icon (such as the icon "All") at the predetermined location in the group message display interface is tapped, the messages posted by all the contacts can be displayed in the group message display interface according to a time sequence that the messages are posted. Or, after the message quantity in the group message display interface is tapped, corresponding message content can be displayed at the corresponding display location in the group message display interface according to a time sequence that the messages are posted. As such, the user can quickly and conveniently restore the message posted by the other contacts in the group message display interface.

Figure 8:
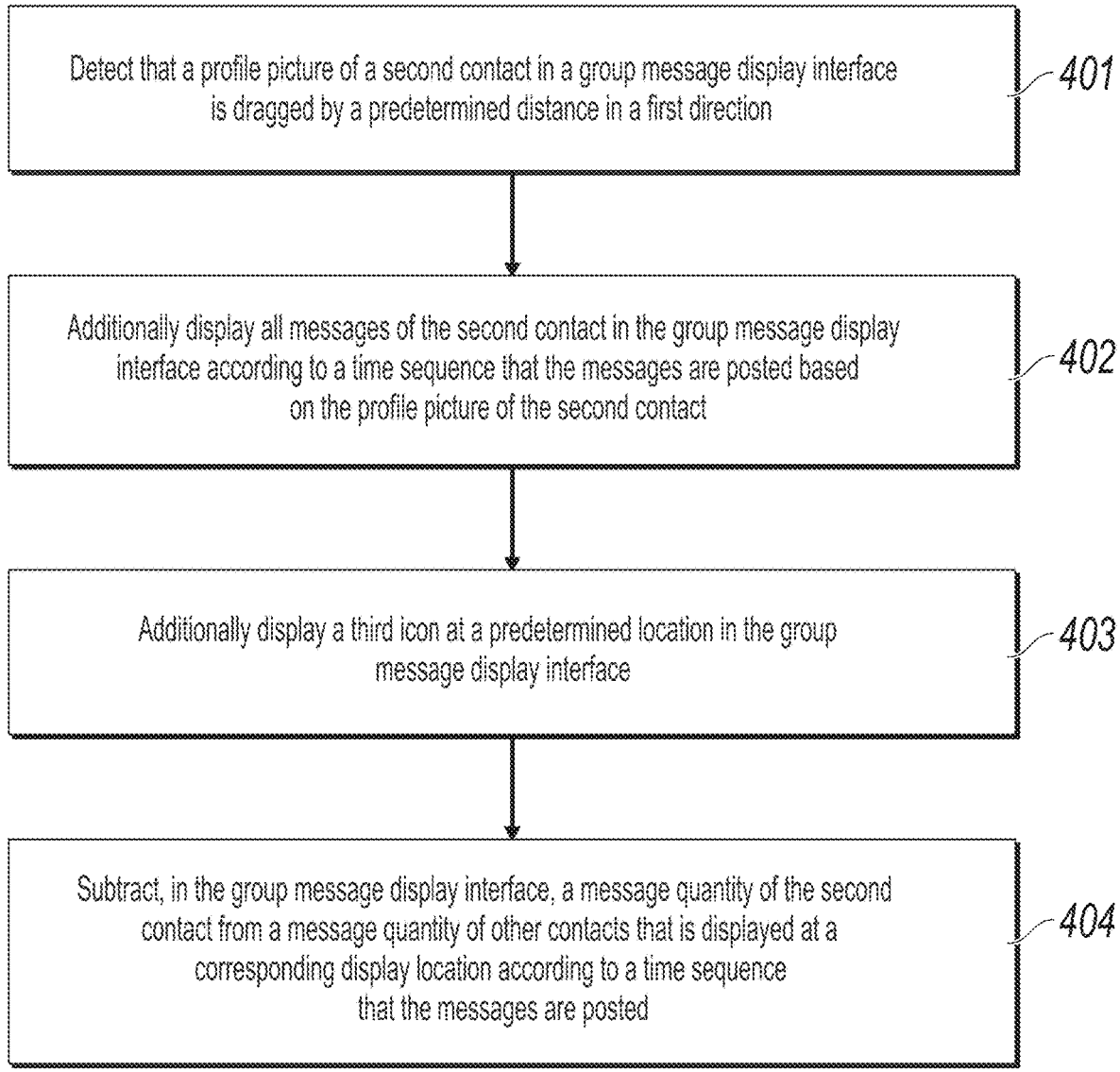
FIG. 8 is a schematic flowchart illustrating a method for processing a group message, according to an implementation of the present application.

FIG. 8 is a schematic flowchart illustrating a method for processing a group message, according to an implementation of the present application. As shown in FIG. 8, after the messages of the first contact are selected, if the user still wants to select messages of a second contact, the method includes the steps below.

401. Detect that a profile picture of a second contact in the group message display interface is dragged by a predetermined distance in the first direction.

Figure 9:
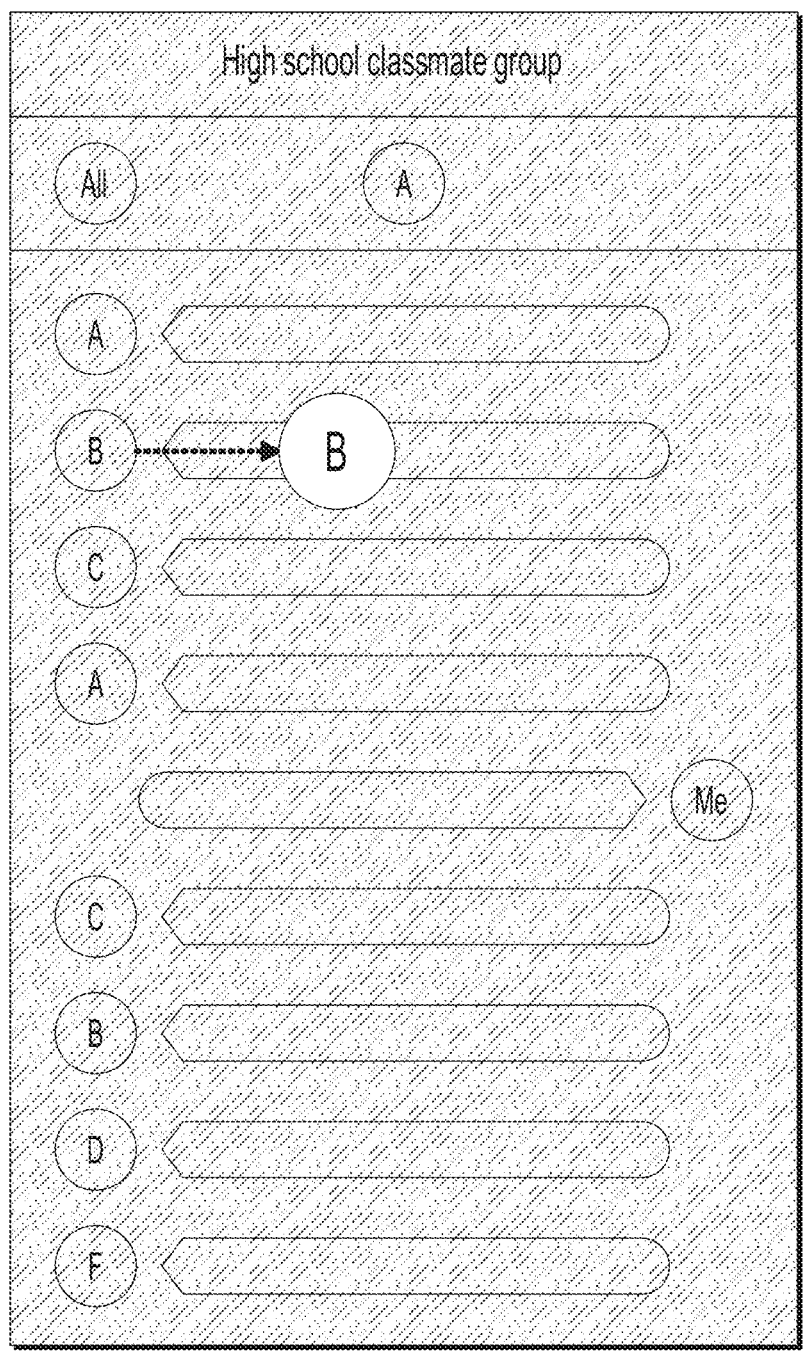
FIG. 9 is a schematic diagram illustrating a profile picture dragging direction, according to an implementation of the present disclosure.

FIG. 9 is a schematic diagram illustrating a profile picture dragging direction, according to an implementation of the present disclosure. As shown in FIG. 9, after the user has selected the messages of contact A, if the user still wants to select messages of contact B, the user drags a profile picture of contact B by a predetermined distance in the horizontal rightward direction along the touchscreen.

402. Additionally display all messages of the second contact in the group message display interface according to a time sequence that the messages are posted based on the profile picture of the second contact.

Figure 10:
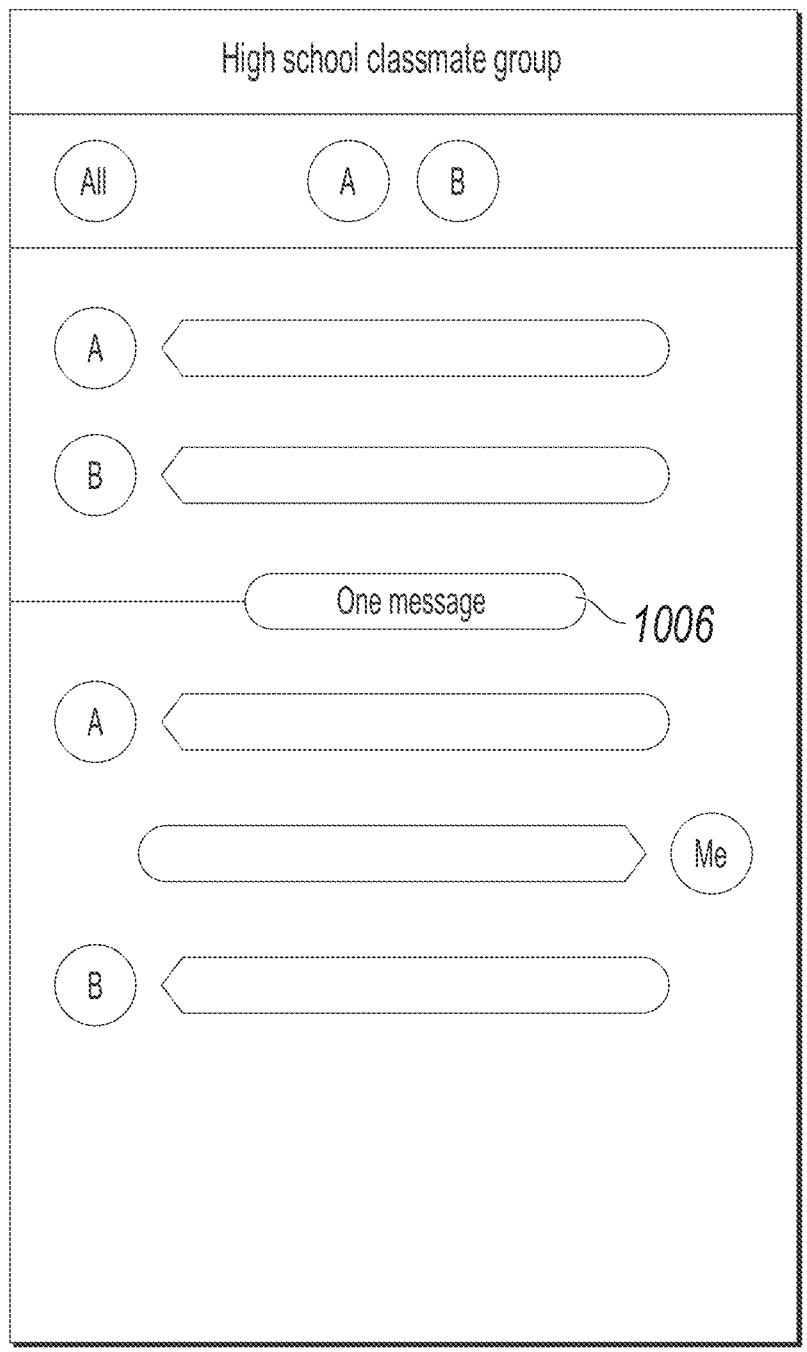
FIG. 10 is a schematic diagram illustrating a display interface of a selected message of a contact, according to an implementation of the present disclosure.

All the messages of the first contact and all the messages of the second contact are displayed according to a time sequence that the messages are posted. As shown in FIG. 10, the messages posted by contact A and messages posted by contact B are displayed in the group message display interface according to a time sequence that the messages are posted.

403. Additionally display a third icon at a predetermined location in the group message display interface.

The third icon represents a profile picture icon indicating the selected second contact.

As shown in FIG. 10, the profile picture of contact B (the second contact) is added to the top location (the predetermined location) in the group message display interface, and the profile picture of contact B can be highlighted or displayed in color (orange).

404. Subtract, in the group message display interface, a message quantity of the second contact from the message quantity of other contacts that is displayed at the corresponding display location according to a time sequence that the messages are posted.

In FIG. 4, one of the two messages originally under the message of contact A is posted by contact B. After the message of contact B is selected, only one message of the other contacts is left under the message posted by contact B. As shown in FIG. 10, in the group message display interface, the quantity of messages posted by contact B (the second contact) is subtracted from the message quantity of the other contacts that is displayed at the corresponding display location according to a time sequence that the messages are posted.

Figure 11:
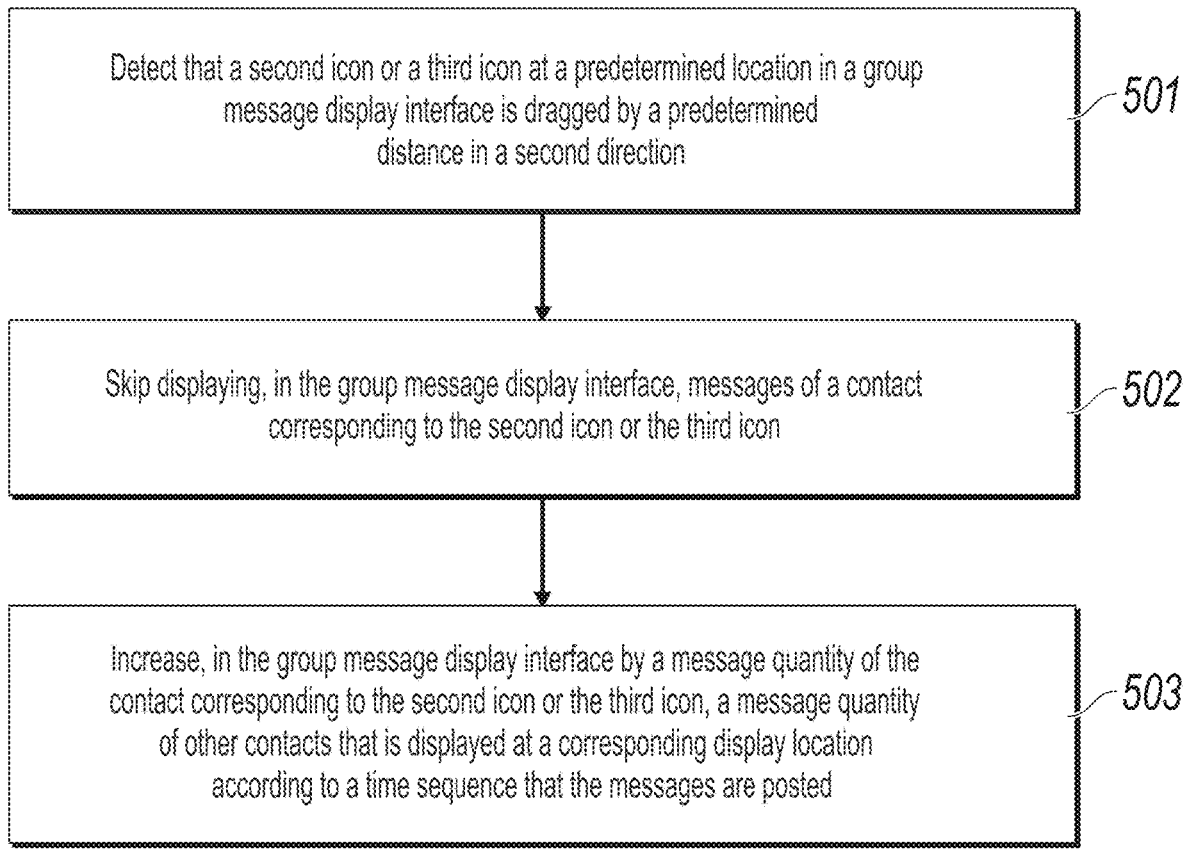
FIG. 11 is a schematic flowchart illustrating a method for processing a group message, according to an implementation of the present application.

FIG. 11 is a schematic flowchart illustrating a method for processing a group message, according to an implementation of the present application. As shown in FIG. 11, the method includes the steps below.

501. Detect that the second icon or the third icon at the predetermined location in the group message display interface is dragged by a predetermined distance in a second direction.

502. Skip displaying, in the group message display interface, messages of a contact corresponding to the second icon or the third icon.

503. Increase, in the group message display interface by a message quantity of the contact corresponding to the second icon or the third icon, the message quantity of the other contacts that is displayed at the corresponding display location according to a time sequence that the messages are posted.

Figure 12:
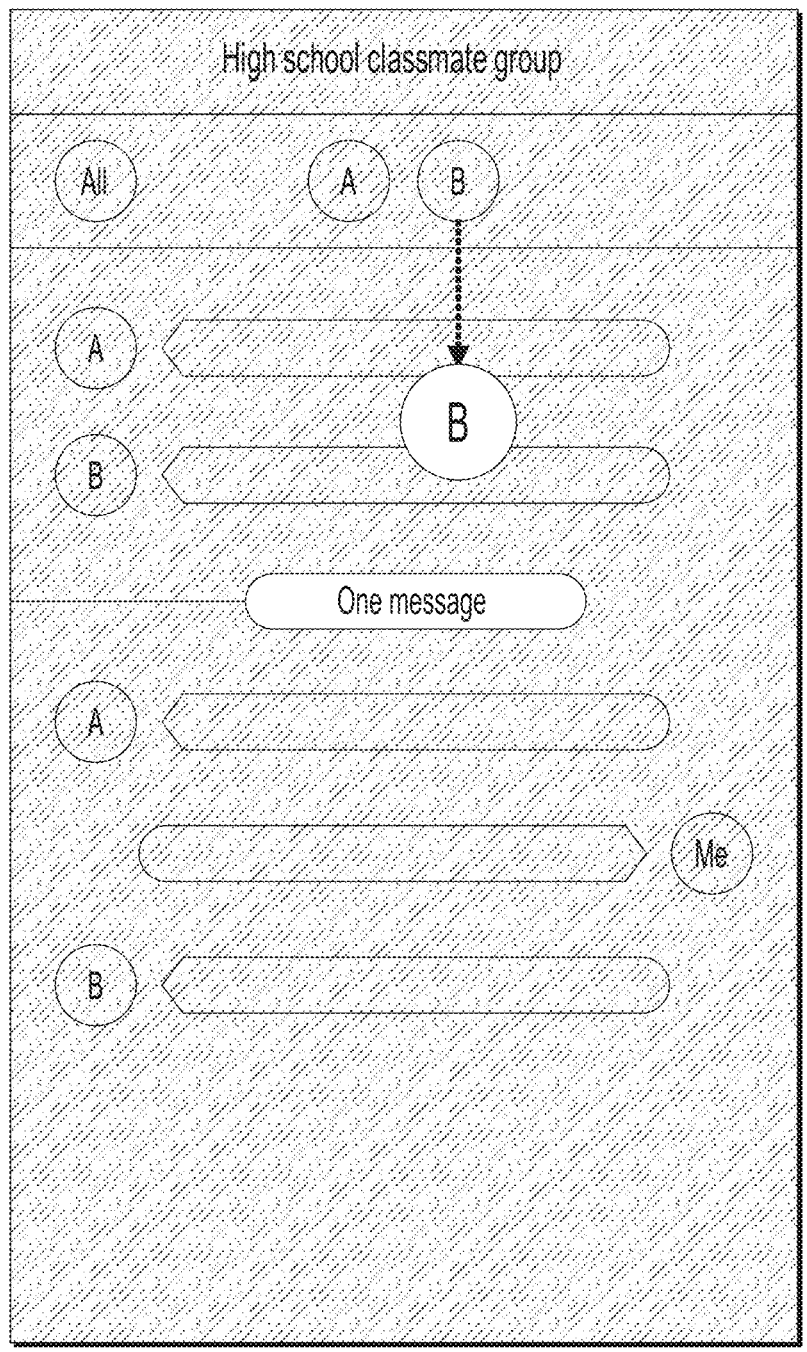
FIG. 12 is a schematic diagram illustrating a profile picture dragging direction, according to an implementation of the present disclosure.

As shown in FIG. 12, when the user wants to delete the message of the selected contact B from the group message display interface, the user only needs to select the profile picture of contact B (the third icon) at the top location (the predetermined location) in the group message display interface, and drag the profile picture of contact B by a certain distance in a horizontal downward direction (the second direction) along the touchscreen. As such, the message posted by contact B is not displayed in the group message display interface. As shown in FIG. 4, in the group message display interface, the message quantity of other contacts that is displayed at the corresponding display location according to a time sequence that the messages posted is increased by the quantity of messages posted by contact B.

In this implementation of the present disclosure, after the profile picture of the selected contact is dragged by a certain distance in a predetermined direction, the message posted by the selected contact in the group message display interface can be deleted, and the message quantity of the other contacts that is displayed at the corresponding display location according to a time sequence that the messages are posted is increased by the quantity of messages posted by the selected contact. As such, the user can quickly and conveniently delete the message posted by the selected contact in the group message display interface. In existing technologies, if the user wants to detect messages posted by a certain contact from group messages, the user needs to select, one by one, messages posted by the contact in the group message display interface to delete the messages, causing cumbersome operations. In the solution in this implementation of the present disclosure, a message deletion operation is simplified, and user experience is improved.

Figure 13:
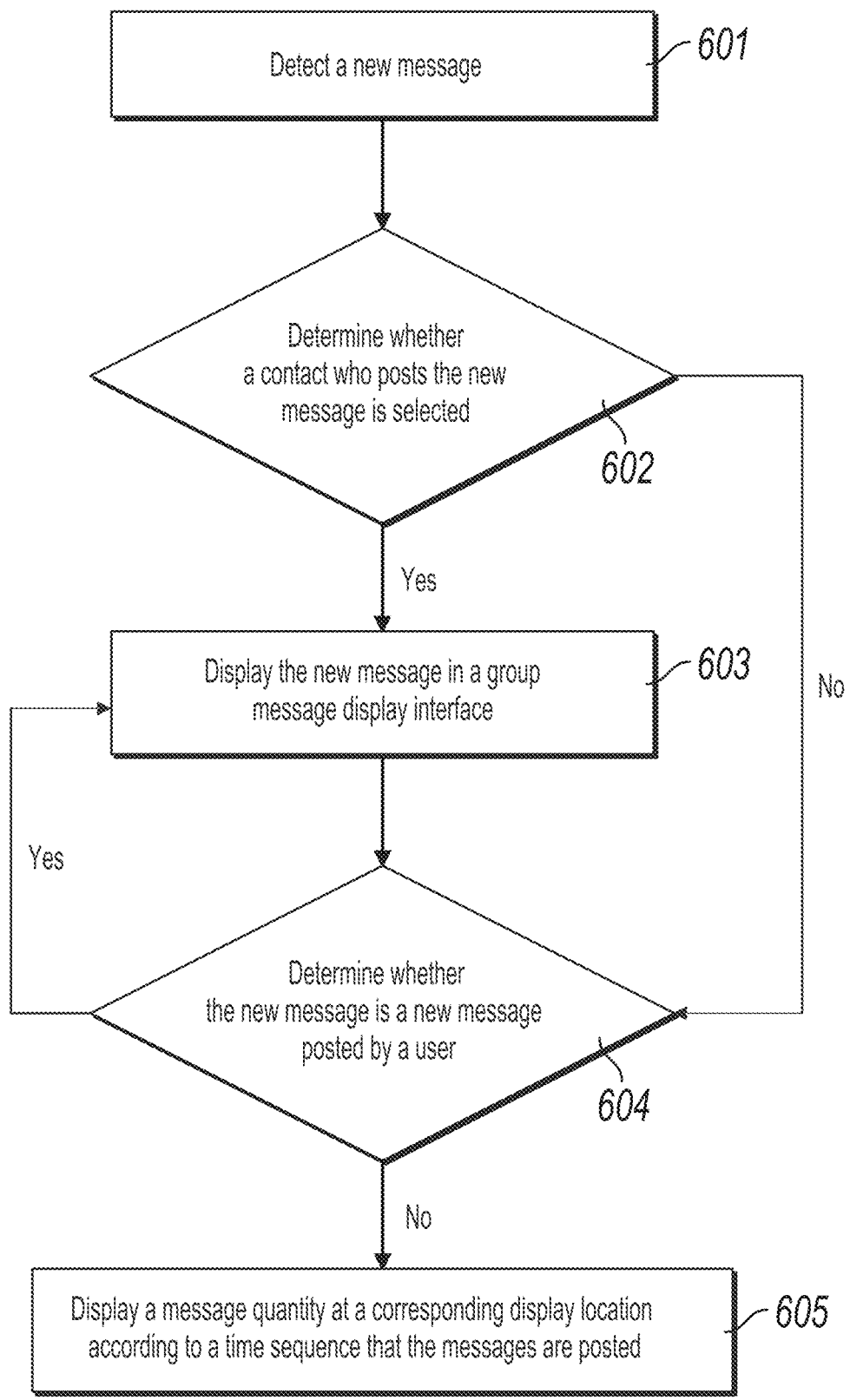
FIG. 13 is a schematic flowchart illustrating a method for processing a group message, according to an implementation of the present application.

FIG. 13 is a schematic flowchart illustrating a method for processing a group message, according to an implementation of the present application. As shown in FIG. 13, the method includes the steps below.

601. Detect a new message.

602. Determine whether a contact who posts the new message is selected; and if yes, perform step 603; or otherwise, perform step 604.

Usually, when a contact posts a message in a group, each message includes user information of the contact. The contact who posts the new message can be determined by using the user information of the contact included in the new message. Based on the method in the implementation shown in FIG. 1, if a user selects a message of one or more contacts in the group, a determination is made as to whether the contact who posts the new message matches the selected contact. If matching is successful, it indicates that the contact who posted the new message is selected. If matching is unsuccessful, it indicates that the contact who posts the new message is not selected.

603. Display the new message in the group message display interface.

604. Determine whether the new message is a new message posted by the user; and if yes, perform step 603; or otherwise, perform step 605.

If the new message is the new message was posted by the user, the new message is displayed in the group message display interface.

605. Display the message quantity at the corresponding display location according to a time sequence that the messages are posted.

If the new message is a new message posted by another contact (neither the user nor the selected contact), the new message is not displayed in the group message display interface. Instead, the message quantity is displayed at the corresponding display location according to a time sequence that the messages are posted.

In this implementation of the present disclosure, after the user sets a selected contact, when a new message is detected, whether the new message is a message posted by the selected contact or the user is first determined. If yes, the new message is directly displayed in the group message display interface. Otherwise, content of the new message is not displayed. Instead, the message quantity is displayed at the corresponding display location according to a time sequence that the messages are posted. Therefore, the user can conveniently and quickly view a message of the selected contact (a contact who the user needs to know), and user experience is improved.

Figure 14:
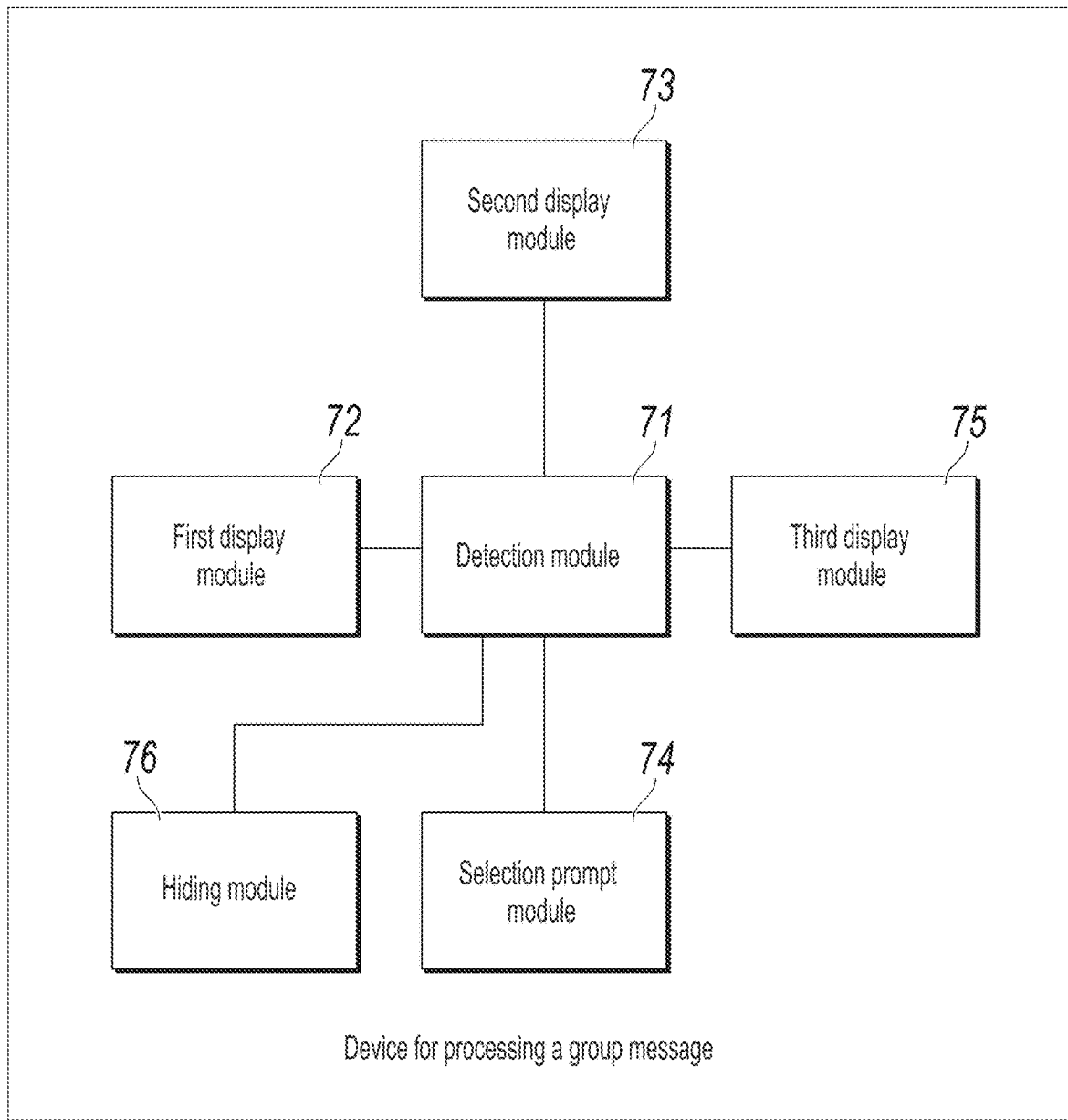
FIG. 14 is a schematic structural diagram illustrating a device for processing a group message, according to an implementation of the present application.

FIG. 14 is a schematic structural diagram illustrating a device for processing a group message, according to an implementation of the present application. As shown in FIG. 14, the device includes a detection module 71, configured to detect an operation for a first contact in a group message display interface; a first display module 72, configured to display all messages of the first contact in the group message display interface according to a time sequence that the messages are posted; and a hiding module 76, configured to hide messages of other contacts.

Optionally, the detection module 71 is further configured to detect that a profile picture of the first contact in the group message display interface is dragged by a predetermined distance in a first direction.

The first display module 72 is further configured to display all the messages of the first contact in the group message display interface according to a time sequence that the messages are posted based on the profile picture of the first contact.

Optionally, the device in the present disclosure further includes a second display module 73, configured to display a message quantity of the other contacts at a corresponding display location in the group message display interface according to a time sequence that the messages are posted.

Optionally, the device further includes a selection prompt module 74, configured to change a color of the group message display interface, and/or display, in the group message display interface, a prompt of selecting the messages of the first contact, after the detection module 71 detects that the profile picture of the first contact in the group message display interface is dragged by the predetermined distance in the first direction.

Optionally, the device further includes a third display module 75, configured to display a first icon and a second icon at a predetermined location in the group message display interface, where the first icon represents an icon indicating all contacts, and the second icon represents a profile picture icon indicating the selected first contact.

Optionally, the detection module 71 is further configured to detect, at the predetermined location in the group message display interface, that the first icon is tapped; and the first display module 72 is further configured to display messages of all the contacts according to a time sequence that the messages are posted; and/or the detection module 71 is further configured to detect, in the group message display interface, that the message quantity is tapped; and the first display module 72 is further configured to display all messages corresponding to the message quantity according to a time sequence that the messages are posted.

Optionally, the detection module 71 is further configured to detect that a profile picture of a second contact in the group message display interface is dragged by a predetermined distance in the first direction, after the first display module 72 displays all the messages of the first contact in the group message display interface according to a time sequence that the messages are posted.

The first display module 72 is further configured to additionally display all messages of the second contact in the group message display interface according to a time sequence that the messages are posted based on the profile picture of the second contact, where all the messages of the first contact and all the messages of the second contact are displayed according to a time sequence that the messages are posted.

The third display module 75 is further configured to additionally display a third icon at a predetermined location in the group message display interface, where the third icon represents a profile picture icon indicating the selected second contact.

The second display module 73 is further configured to subtract, in the group message display interface, a message quantity of the second contact from the message quantity of the other contacts that is displayed at the corresponding display location according to a time sequence that the messages are posted.

Optionally, the detection module 71 is further configured to detect that a second icon or the third icon at the predetermined location in the group message display interface is dragged by a predetermined distance in a second direction.

The first display module 72 is further configured to skip displaying, in the group message display interface, a message of a contact corresponding to the second icon or the third icon.

The second display module 73 is further configured to increase, in the group message display interface by a message quantity of the contact corresponding to the second icon or the third icon, the message quantity of the other contacts that is displayed at the corresponding display location according to a time sequence that the messages are posted.

Optionally, the first display module 72 is further configured to display a new message in the group message display interface, if the detection module detects the new message and determines that the new message is a new message posted by a selected contact or a new message posted by the user.

The second display module 73 is further configured to skip displaying a new message in the group message display interface, and display the message quantity at the corresponding display location according to a time sequence that the messages are posted, if the detection module detects a new message and determines that the new message is a new message posted by the other contacts.

The device shown in FIG. 14 can execute the methods in the implementations shown in FIG. 1 to FIG. 13. Implementation principles and technical effects are not described again, and reference can be made to related descriptions in the previous implementations.

The previous descriptions show and describe several preferred implementations of the present disclosure. However, as described above, it should be understood that the present disclosure is not limited to the form disclosed in present specification, and the form is not intended to be excluded from other implementations, but can be used in various other combinations, modifications, and environments, and can be modified within the scope of the inventive concept of the present specification by using technologies and knowledge in the previous teaching or the related field. In addition, the modifications and variations made by a person skilled in the art all should fall within the protection scope of the appended claims of the present disclosure provided that they do not depart from the spirit and scope of the present disclosure.

Figure 15:
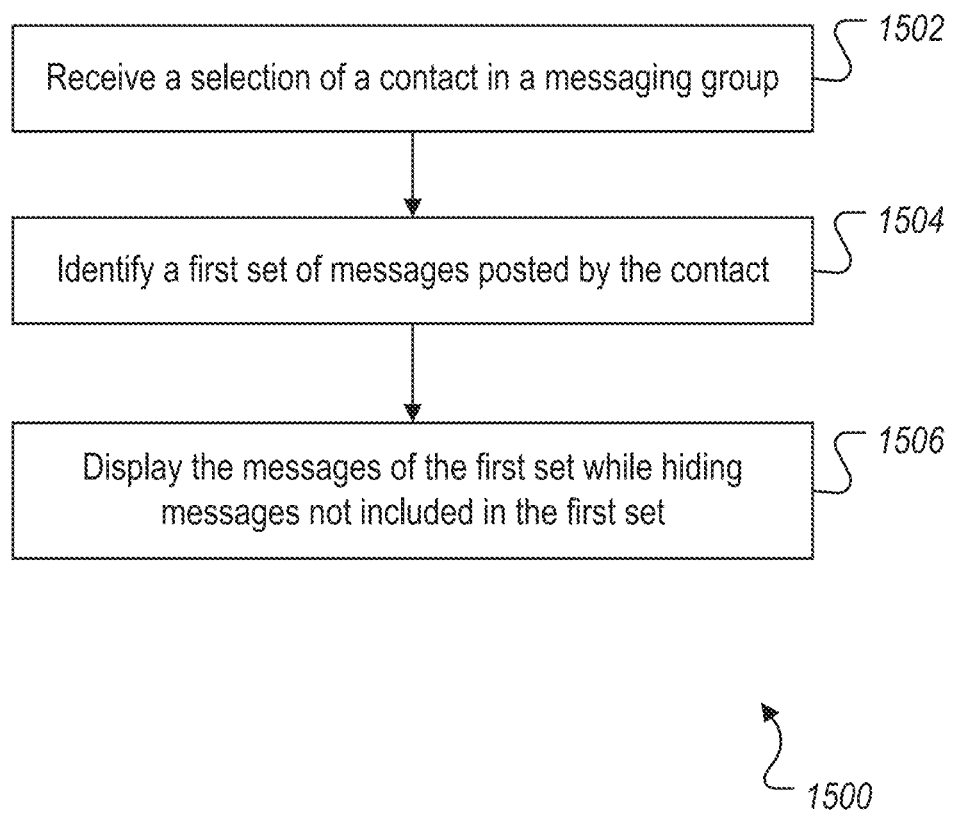
FIG. 15 is a flowchart illustrating an example of a computer-implemented method for presenting messages in a group messaging interface, according to an implementation of the present disclosure.

FIG. 15 is a flowchart illustrating an example of a computer-implemented method 1500 for presenting messages in a group messaging interface, according to an implementation of the present disclosure. For clarity of presentation, the description that follows generally describes method 1500 in the context of the other figures in this description. However, it will be understood that method 1500 can be performed, for example, by any system, environment, software, and hardware, or a combination of systems, environments, software, and hardware, as appropriate. In some implementations, various steps of method 1500 can be run in parallel, in combination, in loops, or in any order.

At 1502, a selection of a contact in a messaging group is received. The messaging group includes a plurality of messages that are posted by one or more contacts. The contacts are the members of the messaging group such as the high school classmate group presented in FIG. 2.

A user may select a contact by clicking, tapping, dragging, or moving an icon associated with the contact. For example, in FIG. 3 a user selects contact A by moving an icon associated with the profile of contact A in the messaging group. In some implementations, the selection may require moving the icon by a predetermined distance, in a particular (predetermined) direction and/or along a particular (predetermined) path on a display interface that presents the messaging group, in order to be considered as the selection aimed for in 1502. For example, the selection in the embodiment presented in FIG. 3 is a horizontal rightward movement of the icon along the touchscreen. From 1502, method 1500 proceeds to 1504.

At 1504, a first set of messages that are posted by the selected contact are identified. The first set of messages includes one or more messages that are posted by the selected contact in the messaging group. In some implementations, the first set of messages also includes the messages that are posted by the user from whom the contact selection is received at 1502. From 1504, method 1500 proceeds to 1506.

At 1506, the messages of the first set of messages are displayed while messages not included in the first set of messages are hidden. The messages of the first set of messages can be displayed according to a time sequence that the messages were posted on the messaging group.

In some implementations, a second set of messages that are not posted by the selected contact are identified. The second set of messages includes the messages that are posted on the messaging group by users other than the selected contact. In some implementations, the messages posted by the user (from whom the contact selection is received) are excluded from the second set of messages. In some cases, a hidden message quantity is determined and displayed on the display interface. The hidden message quantity can be determined by counting the number of messages that are in the second set of messages. The message quantity and the first set of messages can be displayed on the same display interface.

FIG. 4 depicts an example display of a first set of messages while hiding the second set of messages. The first set of messages in FIG. 4 includes the messages posted by the selected contact A, and the user who selected contact A (depicted in the figure as the user associated with the icon "Me").

The message quantity can be a sum of one or more message sub-quantities. Each sub-quantity indicates a number of messages of the second set that were temporally posted between two consecutive messages of the first set of messages. One or more message sub-quantities can be presented in addition to or instead of displaying the message quantity. FIG. 4 depicts an example message sub-quantity 406 that represents two messages posted by contacts other than the selected contact A (and the selecting user).

One or more message sub-quantities can be displayed according to a time sequence associated with the posting time of the messages on the messaging group. For example, a sub-quantity can be displayed in between two consecutive messages of the first set that were respectively posted before and after the messages represented by the sub-quantity. The location of the sub-quantity 406 in FIG. 4 indicates that the messages associated with the sub-quantity 406 were posted at some time after the message 408 and before the message 410 were posted (which were posted by the selected contact A).

In some implementations, sub-quantities can be selected to provide more information about the messages that they represent. For example, the user can select a sub-quantity (e.g., the sub-quantity 406) to view the messages that are represented by the sub-quantity.

The user can select multiple contacts to view the messages posted by the multiple contacts. Upon receiving a user input indicating a selection of an additional contact, a third set of messages that are posted by the additional contact is identified. The messages in the third set of messages is displayed in addition to the messages in the first set of messages. For example, FIG. 10 depicts a display of the messages posted by the contacts A and B, that were selected in FIGS. 3 and 9, respectively.

To update the message quantity, the messages in the third set of messages are counted and subtracted from the message quantity. The updated message quantity can be displayed to indicate a number of messages that are not posted by any of the selected contacts (or the user). The sub-quantities can be updated in a similar manner. For example, the sub-quantity 406 depicted in FIG. 4 includes a message from contact B. Upon selecting the contact B (FIG. 9), the sub-quantity 406 is updated to the sub-quantity 1006.

To remove the messages posted from a particular contact from the display interface, the user can remove the particular contact from a list of the selected contacts. Each of the selected contacts can be represented by a display icon, and a contact can be removed from the list of selected contacts by selecting an icon associated with the contact. For example, FIG. 12 depicts an example of removing the selected contact B by selecting an icon (e.g., a profile picture) associated with the contact B from a list of the icons that represent the selected contacts A and B. In some implementations, the icon needs to be moved in a particular path or direction in order to be removed.

Once a particular contact is removed from the selected list of contacts, the messages that were posted by the particular contact are removed from the display interface. For example, upon removing contact B in FIG. 12, the display interface displays the messages depicted in FIG. 4, which include only the messages posted by the selected contact A and the user.

In addition or alternatively, the message quantity is updated to include a number of the messages that are posted by the removed contact. To do so, the number of the messages that are posted by the removed contact are counted and added to the message quantity. The updated message quantity can be displayed.

In case that upon removing a contact from the list of selected contacts no selected contact is left, no messages or all messages posted in the grouping message are displayed. Alternatively or in addition, to view all messages, the user can select a particular display icon that indicates a display of all messages posted on the messaging group. For example, the user can select the icon 402 to view all messages (and not just the messages posted by the selected contact A and the user). The messages can be displayed according to a time sequence that the messages were posted.

When a new message is received while one or more contacts are selected (e.g., in FIG. 4), a determination is made as to whether the new message is posted by one of the selected contacts. If the new message is posted by any of the selected contacts, the new message is displayed on the display interface. If the new message is posted by a contact other than the selected contacts, the message is hidden from the display interface. Instead or in addition, the message quantity is incremented by one, to represent the new message. In some implementations the messages posted by the user are displayed on the display interface regardless of what other contacts are selected. In some implementations, similar to selecting any other contact, an icon associated with the user needs to be selected in order to display the messages posted by the user.

A plurality of users of a network can create a messaging group to send and receive messages or share information with each other. Typically, the messages are displayed on a display interface according to a time sequence that the messages were posted. However, the display interface has a limited display window, which usually displays the most recent messages. As a result, the messages that were posted at some earlier time may be moved out of the display window. To find an earlier posted message, a user may need to move the display window, for example through a scroll bar. However, as the messages accumulate, it gets harder to find a particular message from one or more particular contacts by just scrolling the display window.

The implementations of the present disclosure provide a technique to reduce the possibility of missing a message when searching for the message in a messaging group. The implementations filter the messages based on the sender of the messages. A user who is looking for a particular message posted by a particular contact can select the contact from a list of the users that are in the messaging group. Upon receiving the user's selection of a contact, the messages that are posted by contacts other than the selected contact are filtered out and only the messages that are posted by the selected contact are displayed. The user can search this reduced number of messages to find the particular message that the user is looking for. Accordingly, the implementations reduce the possibility of missing a message when looking for a particular message.

In addition, the implementations provide the number of the messages that are posted by the contacts other than the selected contact. The number of messages can be displayed accumulatively (e.g., as a single message quantity) or as one or more numbers (e.g., multiple message sub-quantities) displayed throughout the display interface and according to the time sequence that the messages were posted. The user can select (e.g., click on) one or more of the numbers to view the messages that are represented by the respective numbers. In this way, the user can review the messages that were posted during a particular period of time and/or by particular contacts, which makes it less likely to miss the messages the user is looking for.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method executed by one or more processors, the method comprising:

displaying, by the one or more processors on a display interface, a plurality of messages posted in a messaging group comprising a plurality of contacts;

receiving, by the one or more processors, a user input indicating a selected contact in the messaging group and indicating a maintenance request to maintain visibility of a first set of messages posted by the selected contact while others of the plurality of messages are hidden;

identifying, by the one or more processors and from among the plurality of messages, the first set of messages corresponding to the maintenance request and a second set of messages of the plurality of messages posted in the messaging group, the second set of messages excluding the first set of messages; and updating, by the one or more processors, the display interface to comprise a display icon at a predetermined location, the first set of messages, and one or more aggregation icons representing the second set of messages wherein the updating of the display interface includes hiding at least two of the second set of messages and representing the at least two of the second set of messages with one of the aggregation icons, wherein the one or more aggregation icons comprise a sum of a plurality of sub-quantities, each sub-quantity indicating a number of messages of the second set that were temporally posted between two consecutive messages of the first set of messages and wherein at least one of the sub-quantities and the sum are displayed simultaneously.

2. The computer-implemented method of claim 1, wherein the one or more aggregation icons comprise a hidden message quantity based on a number of messages in the second set of messages.

3. The computer-implemented method of claim 2, wherein the user input is a first user input, the selected contact is a first contact, and the method further comprises:

receiving a second user input indicating a selection of a second contact of the plurality of contacts;

identifying from among the plurality of messages, a third set of messages posted by the second contact;

subtracting a message quantity by a number of messages in the third set of messages to provide a revised hidden message quantity;

displaying on the display interface, one or more messages of the third set of messages; and displaying the revised hidden message quantity by replacing the message quantity with the revised hidden message quantity on the display interface.

4. The computer-implemented method of claim 3, further comprising:

displaying a contact indicator that indicates the first contact whose messages are being displayed;

receiving a user selection of the contact indicator, and in response:

removing the messages of the first set of messages from the display interface; and adding a number of messages that are in the first set of messages to the revised hidden message quantity.

5. The computer-implemented method of claim 2, further comprising:

receiving a new message posted on the messaging group; and determining that the new message is neither posted by the selected contact nor by a user from whom the user input is received, and in response:

incrementing the hidden message quantity by one to provide a revised hidden message quantity, and displaying the revised hidden message quantity without displaying the new message.

6. The computer-implemented method of claim 2, wherein the user input further comprises a tapping the display icon associated with the selected contact.

7. The computer-implemented method of claim 6, wherein one or more messages of the second set are hidden in response to determining that the display icon is dragged by a predetermined distance in a predetermined direction.

8. The computer-implemented method of claim 1, wherein the first set of messages posted by the selected contact are displayed according to a time sequence that the first set of messages were posted on the messaging group.

9. The computer-implemented method of claim 1, further comprising:

displaying the plurality of sub-quantities such that each sub-quantity is displayed in between a respective two consecutive messages of the first set of messages.

10. The computer-implemented method of claim 9, further comprising:

receiving a user selection of a sub-quantity from among the plurality of sub-quantities, and in response, displaying one or more messages that are represented by the sub-quantity.

11. The computer-implemented method of claim 1, wherein the first set of messages comprises one or more messages posted by a user from whom the user input is received.

12. The computer-implemented method of claim 1, further comprising:

receiving a new message posted on the messaging group; and determining that the new message is posted by the selected contact, and in response:

adding the new message to the first set of messages, and displaying the new message.

13. The computer-implemented method of claim 1, further comprising:

receiving a user selection of a particular display icon on the display interface, and in response, displaying all messages posted on the messaging group according to a time sequence corresponding to the all messages posted on the messaging group.

14. A non-transitory, computer-readable medium storing one or more instructions executable by a computer system to perform operations comprising:

displaying, on a display interface, a plurality of messages posted in a messaging group comprising a plurality of contacts;

receiving a user input indicating a selected contact in the messaging group and indicating a maintenance request to maintain visibility of a first set of messages posted by the selected contact while others of the plurality of messages are hidden;

identifying, from among the plurality of messages, the first set of messages corresponding to the maintenance request and a second set of messages of the plurality of messages posted in the messaging group, the second set of messages excluding the first set of messages; and updating the display interface to comprise a display icon at a predetermined location, the first set of messages, and one or more aggregation icons representing the second set of messages wherein the updating of the display interface includes hiding at least two of the second set of messages and representing the at least two of the second set of messages with one of the aggregation icons, wherein the one or more aggregation icons comprise a sum of a plurality of sub-quantities, each sub-quantity indicating a number of messages of the second set that were temporally posted between two consecutive messages of the first set of messages and wherein at least one of the sub-quantities and the sum are displayed simultaneously.

15. The non-transitory, computer-readable medium of claim 14, wherein the one or more aggregation icons comprise:

a hidden message quantity based on a number of messages in the second set of messages.

16. The non-transitory, computer-readable medium of claim 15, wherein the first set of messages posted by the selected contact are displayed according to a time sequence that the first set of messages were posted on the messaging group.

17. The non-transitory, computer-readable medium of claim 16, further comprising:

displaying the plurality of sub-quantities such that each sub-quantity is displayed in between a respective two consecutive messages of the first set of messages.

18. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

displaying, on a display interface, a plurality of messages posted in a messaging group comprising a plurality of contacts;

receiving a user input indicating a selected contact in the messaging group and indicating a maintenance request to maintain visibility of a first set of messages posted by the selected contact while others of the plurality of messages are hidden;

identifying, from among the plurality of messages, the first set of messages corresponding to the maintenance request and a second set of messages of the plurality of messages posted in the messaging group, the second set of messages excluding the first set of messages; and updating the display interface to comprise a display icon at a predetermined location, the first set of messages, and one or more aggregation icons representing the second set of messages wherein the updating of the display interface includes hiding at least two of the second set of messages and representing the at least two of the second set of messages with one of the aggregation icons, wherein the one or more aggregation icons comprise a sum of a plurality of sub-quantities, each sub-quantity indicating a number of messages of the second set that were temporally posted between two consecutive messages of the first set of messages and wherein at least one of the sub-quantities and the sum are displayed simultaneously.

19. The computer-implemented system of claim 18, wherein the one or more aggregation icons further comprise:
a hidden message quantity based on a number of messages in the second set of messages.

20. The computer-implemented system of claim 19, further comprising:
displaying the plurality of sub-quantities such that each sub-quantity is displayed in between a respective two consecutive messages of the first set of messages.

* * * * *